US012322410B2

(12) United States Patent
Agarwal

(10) Patent No.: US 12,322,410 B2
(45) Date of Patent: Jun. 3, 2025

(54) SYSTEM AND METHOD FOR HANDLING UNSPLIT SEGMENTS IN TRANSCRIPTION OF AIR TRAFFIC COMMUNICATION (ATC)

(71) Applicant: HONEYWELL INTERNATIONAL INC., Charlotte, NC (US)

(72) Inventor: Jitender Kumar Agarwal, Bangalore (IN)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 424 days.

(21) Appl. No.: 17/806,565

(22) Filed: Jun. 13, 2022

(65) Prior Publication Data
US 2023/0352042 A1    Nov. 2, 2023

(30) Foreign Application Priority Data
Apr. 29, 2022    (IN) .............................. 202211025236

(51) Int. Cl.
*G10L 15/22*    (2006.01)
*G10L 15/26*    (2006.01)
(Continued)

(52) U.S. Cl.
CPC .............. *G10L 21/10* (2013.01); *G10L 15/26* (2013.01); *G10L 25/78* (2013.01); *G10L 25/93* (2013.01)

(58) Field of Classification Search
None
See application file for complete search history.

(56) References Cited

U.S. PATENT DOCUMENTS

| 5,333,275 A | 7/1994 | Wheatley et al. |
| 6,230,131 B1 * | 5/2001 | Kuhn ...................... G10L 13/08 704/266 |

(Continued)

FOREIGN PATENT DOCUMENTS

| CN | 111785257 A | 10/2020 |
| CN | 112954122 A | 6/2021 |

(Continued)

OTHER PUBLICATIONS

Furui Sadaoki; "Recent advances in robust speech recognition" Assistant-based speech recognition from ATM applications. Apr. 17, 1997 pp. 11-20 Section 4.1 XP093050804 Retrieved from the Internet: URL:https//www.isca-speech.org/archive_open_archive_papers/rsr_97/rsr7_011.pdf.

(Continued)

*Primary Examiner* — Neeraj Sharma
(74) *Attorney, Agent, or Firm* — Lorenz & Kopf LLP

(57) ABSTRACT

Systems and methods are provided for a transcription system with voice activity detection (VAD). The system includes a VAD module to receive incoming audio and generate an audio segment; and a speech decoder with a split predictor to perform, in a first pass, a decode operation to transcribe text from an audio segment into a message; wherein in the first pass, if the message is determined not to contain a split point based on a content-based analysis performed by the split predictor, the speech decoder forwards the message for display and if the message is determined based on the content-based analysis to contain the split point, the speech decoder performs in a second pass, a re-decode operation to transcribe text from the audio segment based on the split point wherein the split point is configured within an audio domain of the audio segment by the split predictor and forward the message for display.

8 Claims, 4 Drawing Sheets

(51) Int. Cl.
  *G10L 21/10* (2013.01)
  *G10L 25/78* (2013.01)
  *G10L 25/93* (2013.01)

(56) References Cited

U.S. PATENT DOCUMENTS

| | | | |
|---|---|---|---|
| 6,463,413 B1 | 10/2002 | Applebaum et al. | |
| 8,249,870 B2 | 8/2012 | Roy et al. | |
| 8,306,675 B2 | 11/2012 | Prus et al. | |
| 8,577,913 B1* | 11/2013 | Hansson | G06F 16/9535 |
| | | | 707/767 |
| 8,626,498 B2 | 1/2014 | Lee | |
| 9,355,094 B2 | 5/2016 | Cuthbert et al. | |
| 9,368,108 B2 | 6/2016 | Liu et al. | |
| 9,786,283 B2 | 10/2017 | Baker | |
| 10,152,968 B1 | 12/2018 | Agrusa et al. | |
| 10,403,274 B2 | 9/2019 | Girod et al. | |
| 10,515,625 B1* | 12/2019 | Metallinou | G10L 15/22 |
| 10,573,304 B2 | 2/2020 | Gemmeke et al. | |
| 10,629,186 B1 | 4/2020 | Slifka | |
| 10,878,807 B2 | 12/2020 | Tomar et al. | |
| 11,423,887 B2* | 8/2022 | Pust | G08G 5/0013 |
| 12,087,276 B1* | 9/2024 | Nokob | G10L 25/78 |
| 2005/0165602 A1 | 7/2005 | Cote et al. | |
| 2013/0144414 A1* | 6/2013 | Kajarekar | G10L 17/02 |
| | | | 700/94 |
| 2013/0197917 A1 | 8/2013 | Dong et al. | |
| 2015/0100311 A1* | 4/2015 | Kar | G08G 5/0013 |
| | | | 704/231 |
| 2015/0217870 A1 | 8/2015 | McCullough et al. | |
| 2016/0093302 A1* | 3/2016 | Bilek | G08G 5/065 |
| | | | 704/235 |
| 2016/0379640 A1 | 12/2016 | Joshi et al. | |
| 2018/0047387 A1 | 2/2018 | Nir | |
| 2018/0129635 A1 | 5/2018 | Saptharishi et al. | |
| 2019/0147858 A1 | 5/2019 | Letsu-Dake et al. | |
| 2019/0310981 A1* | 10/2019 | Sevenster | G16H 15/00 |
| 2020/0027457 A1 | 1/2020 | Gelinske et al. | |
| 2020/0075044 A1 | 3/2020 | Jankowski, Jr. et al. | |
| 2020/0104362 A1* | 4/2020 | Yang | G06N 5/048 |
| 2020/0135204 A1* | 4/2020 | Robichaud | G10L 25/51 |
| 2020/0171671 A1 | 6/2020 | Huang et al. | |
| 2020/0183983 A1* | 6/2020 | Abe | G06F 16/90332 |
| 2021/0020168 A1 | 1/2021 | Pabla et al. | |
| 2021/0074277 A1 | 3/2021 | Duncan | |
| 2021/0225371 A1 | 7/2021 | Takacs et al. | |
| 2021/0233411 A1 | 7/2021 | Saptharishi et al. | |
| 2021/0342634 A1* | 11/2021 | Chen | G06F 16/137 |
| 2022/0115019 A1 | 4/2022 | Bradley et al. | |
| 2022/0115020 A1 | 4/2022 | Bradley et al. | |
| 2022/0238118 A1 | 7/2022 | Mazzoccoli | |

FOREIGN PATENT DOCUMENTS

| | | |
|---|---|---|
| EP | 2669889 A2 | 12/2013 |
| EP | 4095853 A1 | 11/2022 |
| WO | 2009104332 A1 | 8/2009 |

OTHER PUBLICATIONS

Park, Tae Jin, et al.: "A review of speaker diarization: Recent advances with deep learning", arXiv article, Jan. 24, 2021 (Jan. 24, 2021), XP055935769, DOI: 10.1016/j.csl.2021.101317 Retrieved from the Internet:URL:https://arxiv.org/pdf/2101.09624vl.pdf [retrieved on Jun. 27, 2022].

Nikolaos Flemotomos, et al.: "Linguistically Aided Speaker Diarization Using Speaker Role Information", arxiv.org, Cornell University Library, 201 Olin Library Cornell University Ithaca, NY 14853, Nov. 18, 2019 (Nov. 18, 2019), XP081593342.

* cited by examiner

SYSTEM AND METHOD FOR HANDLING UNSPLIT SEGMENTS IN TRANSCRIPTION OF AIR TRAFFIC COMMUNICATION (ATC)

CROSS-REFERENCE TO RELATED APPLICATION

The present application claims benefit of prior filed India Provisional Patent Application No. 202211025236, filed Apr. 29, 2022, which is hereby incorporated by reference herein in its entirety.

TECHNICAL FIELD

The subject matter described herein relates generally to vehicle systems, and more particularly, embodiments of the subject matter relate to avionics systems and methods for determining split points when transcribing audio input in cockpit communications for enabling a better display of messages.

BACKGROUND

Even though datalink technologies are employed in in-flight communications, a majority of communications between an Air Traffic Controller (ATC) and a pilot is through speech using cockpit radio channels. Speech recognition applications are used in aircraft systems for transcription of ATC-pilot communications as well as for providing other commands, control, and automatic terminal information service (ATIS) information.

Because of the fast-paced environment in the control tower, and this is especially the case at large and busy airports that handle a voluminous number of take-offs and landings at any given time of the day, the controllers in this type of environment often speak faster than in a normal speech environment to save time which is in part because of the need to respond to multiple requests from aircraft traffic in the vicinity. This is also true in instances when responses on the part of the controllers are required that are deemed formalities such as customary confirmations of a pilot read-back of clearance or other flight instructions.

This faster rate of dialogue causes the duration of pauses between the common back and forth exchanges between a controller and a pilot, such as during broadcasting and confirming of a clearance message, to be shorter than experienced in normal conversation. Any time difference of less than a threshold amount of approximately 20 milliseconds (ms) is deemed significantly less than normal pauses between speakers, which are usually in the range of thirty to forty ms. The result is that the operation of conventional Voice Activity Detection (VAD) devices of an Automatic Speech Recognition (ASR) system that is used to monitor fast controller/pilot dialogues by transcription systems may not function properly, as the devices are not configured to take into account such low time differences between two conversants. The conventional VAD device as an example, may not detect instances of a speaker change because of its inability to detect the speaker change in shorter than normal pauses where speaker switchovers occur in a dialogue.

When the time difference between speaker responses in the dialogue falls within a ten-millisecond range, the VAD device in operation may not be able to properly segment a clearance message that is being exchanged between parties. Any failure in VAD may result in an unsplit message that can cause propagation in errors and cascading of errors by the ASR application, thereby causing an extra burden on ASR application or other post ASR processing applications used to separate and recognize meaningful messages. This may also result in different message segments that are intended to be separated in a clearance instruction to be mis-joined and a confusing message will likely be displayed to the pilot that may not be readily readable and may require some further effort and time on the part of the pilot to decipher.

It is desirable to provide processes and systems that overcome decode errors caused by improperly unsplit messages in a real-time flight transcription of incoming audio.

It is desirable to provide processes and systems that reduce errors or failures in the accuracy of message transcriptions so that further transcription errors are not caused as a result of the unsplit message decode errors in a post or subsequent processing step used in the transcription process such as Natural Language Processing (NLP).

Other desirable features and characteristics of the methods and systems will become apparent from the subsequent detailed description and the appended claims, taken in conjunction with the accompanying drawings and the preceding background.

BRIEF SUMMARY

Aircraft systems and related operating methods are provided. In one embodiment, a transcription system with voice activity detection (VAD) includes a VAD module that is configured with an input channel to receive incoming audio and to generate at least one audio segment based on the incoming audio; and a speech decoder in operable communication with a split predictor and the VAD module, the speech decoder is configured to perform, in a first pass, a decode operation to transcribe text from at least one audio segment into a message; wherein in the first pass, if the message is determined not to contain at least one split point based on a content-based analysis performed by the split predictor, the speech decoder forwards the message for display; wherein in the first pass, if the message is determined, based on the content-based analysis performed by the split predictor, to contain at least one split point, the speech decoder performs, in a second pass, a re-decode operation to transcribe text from at least one audio segment based on at least one split point and forwards the message for display configured in multiple text segments based on at least one audio split point, wherein at least one split point is configured within an audio domain of the at least one audio segment by the split predictor.

In at least one exemplary embodiment, the message for display is determined to not contain any split points.

In at least one exemplary embodiment, the transcription system includes a natural language processor (NLP) in operable communication with the speech decoder configured to communicate with the split predictor to provide content information about the message for the content-based analysis.

In at least one exemplary embodiment, the content-based analysis performed by the split predictor includes an intelligent application that determines at least repetitive usage of call signs or critical information in the content of the message defining at least one split point in the message.

In at least one exemplary embodiment, the message containing at least one split point is an unsplit message.

In at least one exemplary embodiment, the unsplit message is caused by at least a pause in the incoming audio that is not detected by the VAD module.

In at least one exemplary embodiment, wherein the pause is less than a threshold value configured in a set of ranges of approximately 10, 20, and 30 milliseconds or less.

In another exemplary embodiment, a method of implementing a transcription system is provided. The method includes receiving, by a voice activity detection (VAD) module, incoming audio to generate at least one audio segment; in a first pass, decoding, by a speech decoder coupled to the VAD module, text from at least one audio segment to generate a message; and determining, by a split predictor coupled to the speech decoder, and based on a content-based analysis, whether the message contains a split point; wherein if the message does not contain the split point then enabling display of the message; wherein if the message does contain the split point, then enabling re-decode by the speech decoder of at least one audio segment based on the split point configured by the split point predictor from the content-based analysis, and enabling the display of the message configured in multiple text segments based on at least one audio split point, wherein the split point in the message is defined in an audio domain of the at least one audio segment.

In at least one exemplary embodiment, the split point in the message is not configured by the split predictor in a textual domain of the message.

In at least one exemplary embodiment, the method includes configuring a natural language processor (NLP) in operable communication with the speech decoder to communicate with the split predictor for providing content information about the message for the content-based analysis.

In at least one exemplary embodiment, the content-based analysis performed by the split predictor includes an intelligent application that determines at least repetitive usage of call signs or critical information in the content of the message defining at least one split point in the message.

In at least one exemplary embodiment, the message containing at least one split point is an unsplit message.

In at least one exemplary embodiment, the unsplit message is caused by at least a pause in the incoming audio that is not detected by the VAD module.

In at least one exemplary embodiment, the pause is less than a threshold value configured in a set of ranges of approximately 10, 20, and 30 milliseconds or less.

In yet another exemplary embodiment, at least one non-transient computer-readable medium having instructions stored thereon that are configurable to cause at least one processor to perform a method to segment a transcribed textual message by a transcription system is provided. The method includes receiving, by a voice activity detection (VAD) module incoming audio to generate at least one audio segment; in a first pass, decoding, by a speech decoder coupled to the VAD module, text from at least one audio segment to generate a message; and determining, by a split predictor coupled to the speech decoder, and based on a content-based analysis whether the message contains a split point; wherein if the message does not contain the split point then enabling display of the message; wherein if the message does contain the split point then enabling re-decode by the speech decoder of at least one audio segment based on the split point configured by the split point predictor from the content-based analysis, and enabling the display of the message configured in multiple text segments based on at least one audio split point wherein the split point in the message is defined in an audio domain of at least one audio segment by the split predictor.

In at least one exemplary embodiment, the split point in the message is not configured by the split predictor in a textual domain of the message.

In at least one exemplary embodiment, the method includes configuring a natural language processor (NLP) in operable communication with the speech decoder to communicate with the split predictor to provide content information about the message for the content-based analysis.

In at least one exemplary embodiment, the content-based analysis performed by the split predictor includes an intelligent application that determines at least repetitive usage of call signs, and critical information, or multiple speaker dialogues in the content of the message defining at least one split point in the message.

In at least one exemplary embodiment, the message containing at least one split point is an unsplit message, wherein the unsplit message is caused by at least a pause in the incoming audio that is not detected by the VAD module.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
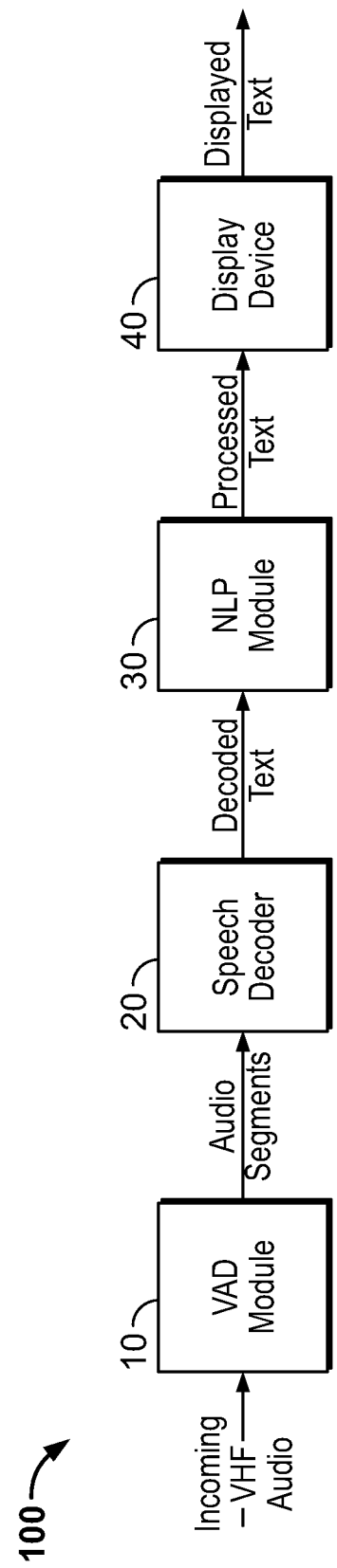
FIG. 1 depicts an exemplary embodiment of a processing system of a transcription system which may be utilized with a vehicle, such as an aircraft in accordance with an embodiment.

The following detailed description is merely exemplary in nature and is not intended to limit the subject matter of the application and uses thereof. Furthermore, there is no intention to be bound by any theory presented in the preceding background, brief summary, or the following detailed description.

The Air Traffic Controller (ATC) is typically involved with voice communications between a pilot or crewmember onboard the various aircraft within controlled airspace. The ATC and the pilot are often in constant communication over a Voice Channel or the CPDLC throughout the flight. The ground-to-air communications include clearance, information, or requests for message elements. The ATC to pilot communications has several limitations including, but not restricted to, miscommunication, transmission errors, misinterpreted voice instructions, ambiguous communications, and non-standard phraseology that can cause an increased pilot overload of operational tasks when listening to ATC amidst flying the aircraft.

There are other sources, too, that contribute to communication errors in ATC to pilot dialogue and include cockpit transcription systems that generate long unsplit text segments that are displayed for pilot review. If the pause or silence between the ATC clearance is followed by a pilot response or vice versa, and there is an overlap caused by noise or other audio alerts or ATIS or pilot intercom audio, the VAD device in a transcription system can fail to detect a split point in the audio segment and then the result is a long unsplit audio segment for decoding.

Typically, in a flight, almost 10-30 percent of unsplit segments are observed and thus the high number of unsplit segments impacts the ATC transcription performance. Although a major contributor to the unsplit segment is due to overlap of intercom or ATIS, a small percentage is still due to VAD operational issues. As an example, the time difference between the back and forth in a controller/pilot dialogue can be in the range of 10 milliseconds (ms), 20 ms, or 30 ms, and this can result in the accumulation of continuous voice segments or continuous non-voice segments of around 120-150 milliseconds that are not properly split and from which a determination of split points for the splitting of audio is desirable for improved transcription.

If the VAD device is better trained to cope with pauses and segments within 10-20 ms, the percentage of unsplit segments may be reduced. There is also a balance required length, as even if a better trained VAD device is used, short utterances can cause unsatisfactory split segments, so there is a trade-off in setting the appropriate VAD threshold to deduce the split point. Therefore, it is desirable to mitigate the need for unsplit segments by determining appropriate split points to split the segment for optimal performance of the speech decoder and to improve the overall ATC transcription performance.

In in-flight operations, there exists a large number of terminology associated with different arrival procedures, approaches, and departure procedures. The ATC-pilot communication in a customary dialog will contain a general class of keywords that includes call sign specific keywords that allow both parties in the communication dialog to know or identify the flight to prevent or at least limit confusion with respect to flight specific instructions. In embodiments, the ATC-pilot communication may include a realm of different types of messages that include a clearance instruction, an advisory message, or query (question) issued by the controller to the pilot as well as readback requests, reports, or queries issued by the pilot to the controller. In either case, there may be specific keywords used in the respective flight operations that can be used to better segment a transcribed communication for a display to the pilot.

In various exemplary embodiments, the present disclosure describes methods and systems that automatically provide a display of a segmented transcribed text of clearance or other communication of the flight operations to the pilot or other flight personnel using split points determined by a split predictor that better prevent miscommunications in ATC instructions and other disruptions in flight operations caused by improper unsplit messages displayed. Appropriate split messages can also decrease the workload experienced by the pilot by not having to decipher unsplit messages displayed, and this may prove especially vital during high workload time-critical flight stages.

In various exemplary embodiments, methods and systems described are associated with a voice-activated flight deck that enables speech recognition or brings a speech recognition system into the cockpit for the display of messages in a dialogue with shorter pauses times that is experienced between air traffic control and the flight personnel.

In various exemplary embodiments, the methods and systems provide capabilities associated with command and control and transcribing of ATC conversations.

In various exemplary embodiments, the present disclosure describes methods and systems that reduce the pilot's workload by improving a current display model of transcribed text based on segmenting of transcribed text for display during the runtime of the transcription system.

In various exemplary embodiments, the present disclosure describes methods and systems that reduce frequency congestion experienced by reducing the need between the pilot and ATC to make repeated requests for clearance communications based on improvements of displayed transcribed text that would normally be improperly unsplit by the transcription system and the enabling of appropriate split points to split messages from callsign and other clearance information determined from intelligent algorithms with natural language processing methods when decoding text. Other residual benefits to existing and planned cockpit functionality may include enhancements to playback of radio communications and real-time display of transcriptions of radio communications which are more contextual and intelligent.

For purposes of explanation, the subject matter is primarily described herein in the context of aircraft operating in controlled airspace; however, the subject matter described herein is not necessarily limited to aircraft or avionic environments, and in alternative embodiments, may be implemented equivalently for ground operations, marine operations, or otherwise in the context of other types of vehicles and travel spaces.

FIG. 1 depicts an exemplary embodiment of a transcription processing system 100 operating during the runtime of a transcription system which may be utilized with a vehicle, such as an aircraft in accordance with an embodiment. FIG. 1 in an exemplary embodiment, shows a transcription processing system 100 that includes, without limitation, the components for receiving audio messages and for converting the audio messages to text in a transcription processing pipeline with a Voice Activity Detection (VAD) module 10, a speech decoder 20, a Natural Language Processing (NLP) module 30, and a display device 40.

In an embodiment, input on an incoming very high frequency (VHF) Airband in an aviation domain is monitored by the VAD module 10. The VAD module 10, in this instance, may be configured to detect either voiced or non-voice portions of audio in communication in the incoming VHF Airband. The VAD module 10 may also be configured to operate on a time-varying non-stationary noise threshold value. As an example, the value can be measured in the inactive section of the voice wavelength audio message that is received via the input by the VAD module 10. In an implementation, an interface, such as a python interface, may be configured in the VAD module 10 via a (Web Real-Time Communication) WebRTC platform that uses an open-source VAD. For instance, the VAD module 10 may use the VHF band features with a pre-trained classifier (e.g., a Gaussian Mixture Model (GMM) or other probabilistic models). The VAD module 10 using such a model may filter out nonvoiced audio frames that make up audio segments and return only the voiced audio segments as output to the speech decoder 20. In an embodiment, the VAD module 10 may be configured in a layer of a Deep Neural Network (DNN) (e.g., configured in a full DNN layer) or could be based on encoder and decoder architecture.

In embodiments, the speech decoder 20 applies various models that may include a lexicon model, a language model, and an acoustic model to generate a decoded word sequence of text. The decoded text is sent to the Natural Language Processing (NLP) module 30 which applies various recognition applications and models to enable content-based language processing of decoded message text. For example, the applications and models can include processes for text classification, keyword extraction, word2vec, and neural network models to extract data from the transcribed text. In an embodiment, the NLP module 30 may be configured to classify and extract aviation-specific terminology by using a selective automatic speech recognition (ASR) model that is tailored to flight contextual data. The processed text is sent to the display device 40 for textual display and viewing/confirmation by flight personnel.

Figure 2:
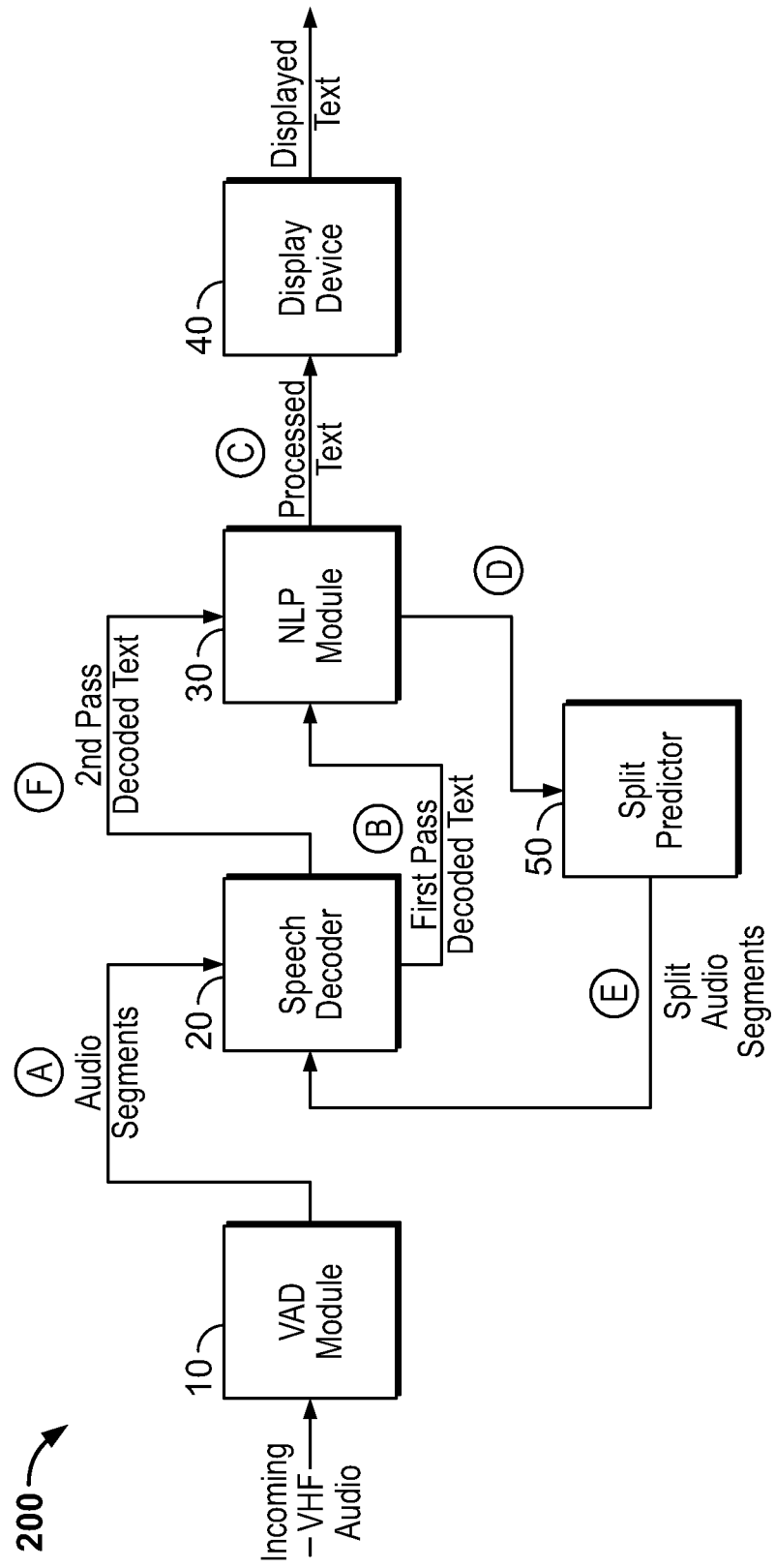
FIG. 2 depicts an exemplary diagram of the processing system with a split predictor of the transcription system which may be utilized with the vehicle, such as an aircraft in accordance with an embodiment.

FIG. 2 illustrates a block diagram of a processing architecture that includes a split predictor 50 for split point detection to segment transcribed text messages by the transcription system in accordance with an embodiment. In FIG. 2, the transcription system 200 is shown with various transcription processing components that have been described in FIG. 1 including the VAD module 10, the speech decoder 20, the NLP module 30, and the display device 40. In FIG. 2, the transcription system 200 includes the additional component of the split predictor 50 that is configured in a feedback path ("D", "E") arrangement between the NLP module 30 and the speech decoder 20.

In an embodiment, in the first pass of a transcription operation by the transcription system 200, audio segments are supplied on path "A" to the speech decoder 20 and the speech decoder 20 is configured to output, on a first pass via path "B", the decoded text to the NLP module 30 for processed text to be displayed as displayed text, via path "C", at a display device 40. The first pass in an operation may represent a first decoding step, and if during the first decoding step, the split predictor 50 does not or fails to predict a split point, then the decoded text (i.e., decoded string of words) is sent directly to the display device 40 for the display of a set of processed text on path "C" on the display device 40.

If the split predictor 50 predicts there is a split point during or after the first pass of a decoded string of text based on the output (i.e., processed text) from the NLP module 30, then another step is configured to initiate a second decode (or a re-decode) operation of the audio segment(s) that has been received by the speech decoder 20 via the VAD module 10. In this instance, to implement the second decode or re-decode operation, the feedback path (E, D) is configured for the split predictor 50 to send split point information to the speech decoder 20 about a split point in an unsplit message. In the feedback path operation, the split predictor 50 determines how to split the audio segment of an unsplit message to enable the speech decoder 20 to appropriately split the message when decoding the message text. The split predictor 50 determines or predicts a split point based on content-based information from the message text by the processing of the NLP module 30. The split point determined or predicted is configured with respect to an audio segment received and not to message text decoded by the speech decoder 20. In the feedback operation (i.e., in a second pass), the output is sent from the NLP module 30 to the split predictor 50 (via path "E"). Then the split point in the audio segment by the split predictor 50 is determined and the speech decoder 20 is instructed via path "F". The result is a new audio segment split point that is used in a speech re-decoding operation or the second pass decoding step by the speech decoder 20 of the audio segment from the VAD module 10. The speech decoder 20, using the new split point, outputs a set (one or more distinct message text segments) of multiple decoded text segments as the output on path "F" after the second pass for display.

In an exemplary embodiment, the split predictor 50 predicts the split point based on classified or extracted text such as call signs or other critical information from the NLP module 30 and by using intelligent algorithms configured with the NLP module 30 such as a neural network, expert system or a hybrid type system.

In embodiments, the split predictor 50 uses the context of the content from the NLP module 30 of decoded text from the speech decoder 20 to determine the information that includes repetitions of call signs, critical information, and other categories of clearance from the decoded text for identifying split points and text segments. In another embodiment, the split predictor 50 determines split points in unsplit messages that do not contain any repetitive use of data, critical information, or call signs. For example, in this instance, the message from the ATC can be a series of quick responses from the pilot or flight controller or vice versa (e.g., a short response with information such as "Roger" or "Wilco"). The split predictor 50 is configured to determine occurrences of such affirmative or non-affirmative short responses based on contextual information gathered from the dialogue and to identify split points in the audio. In other embodiments, such as for a category of clearance such as a traffic alert, the resultant determination or prediction by the split predictor 50 may classify repetitive use of two or more different call signs in a single clearance message and this may result in precluding or dropping of certain split points that mark segments of decoded text message as unsplit. In embodiments, not only is the same call sign (or other critical information) repeated multiple times as described indicative of an unsplit, but also variations of the same call sign or other critical information repeated multiple times may be indicative that the decoded text is unsplit and requires one or more split points as determined by the split predictor 50.

In embodiments, if the repetitive text of call signs with variations or textual duplicates with similar categories are found in a decoded text then a repetitive text is indicative that a processed text segment is both unsplit and requires (multiple) new split points. The repetition of data sets without the repetition of numbers or number sets may also indicate the presence of more than one clearance message in an unsplit processed text. In such cases, it can indicate to the split predictor 50 that there is an endpoint of a first clearance message followed by the start of a second clearance message. In this instance, an unsplit processed text may be configured by the split predictor 50 with a new split point of the corresponding audio segment received by the speech decoder 20. The split point in the audio segment configured by the split predictor 50 would define a set of audio segments or chunks across that as an example would be different messages and the result is a bifurcation of the processed text into multiple messages by the speech decoder 20.

In another exemplary embodiment, in a second pass operation for split point determinations by the split predictor 50, and where multiple processed texts are each processed by the NLP module 30 for output to the display device 40; the result may be a display of more than one unconnected text segments associated with different messages. Hence, in this instance, any confusion caused by the intermingling of multiple sets of different instructions in the communication by the same audio segment is prevented. The clarity of a compound message with more than one instruction voiced by an ATC operator can intuitively be considered a contextual clarification of the message when displayed by the appropriate split point predictions and determinations by the split predictor 50 that make it easier to understand. In an embodiment, the text segments of split messages that have been transcribed are each individually displayed; as an example, a line by line display can be configured that corresponds to each set of processed text segments with appropriate separations by an appropriate call sign or other critical information that is displayed in the output by the transcription system.

In another embodiment, the split predictor 50 may be configured with intelligent applications that include deep learning programs for Artificial Intelligence (AI) contextual based solutions that can determine a split point in an unsplit message based on the content and context of the message or by the historical context of messages from data learned by deep learning programs.

In implementations, the split predictor 50 may apply an intelligent application of a neural network that is trained (supervised or unsupervised) on the decoded text of unsplit processed text segments to determine appropriate split points at different flight phases and different flight routes. The use of trained neural networks may allow stored historic data for more accurate split point predictions by the split predictor 50 of processed text by the NLP module 30. For example, input to the neural network can be constrained to an unsplit segment (i.e., unsplit decoded processed textual segment) that has been generated from the audio dialogue monitored by the VAD module 10. In instances, this resultant type of unsplit processed text message can be caused by the behavior of different inputs (multiple voices, background noise, and other interference) received on the monitor VHF Airband by the VAD module 10. For example, the VAD module 10 can be configured to process audio input via a constant action state and the interference in the behavior of the different inputs may disrupt appropriate audio segment generation (without split points) that is fed by the VAD module 10 to the speech decoder 20. The trained neural network can enable the split predictor 50 to account for variations of behavior in inputs to the VAD module 10 by voluminous amounts of data sets in use, and the result is a compensation for the aberrant input to the VAD module 10 that the VAD module 10 is not equipped to handle. Output from the trained neural network may also be used conversely by the VAD module 10 or the speech decoder 20 to predict audio segments that contain little variation in input and do not split operation to bypass any split prediction operations or analysis required and to send the decoded text segments directly for display.

Figure 3:
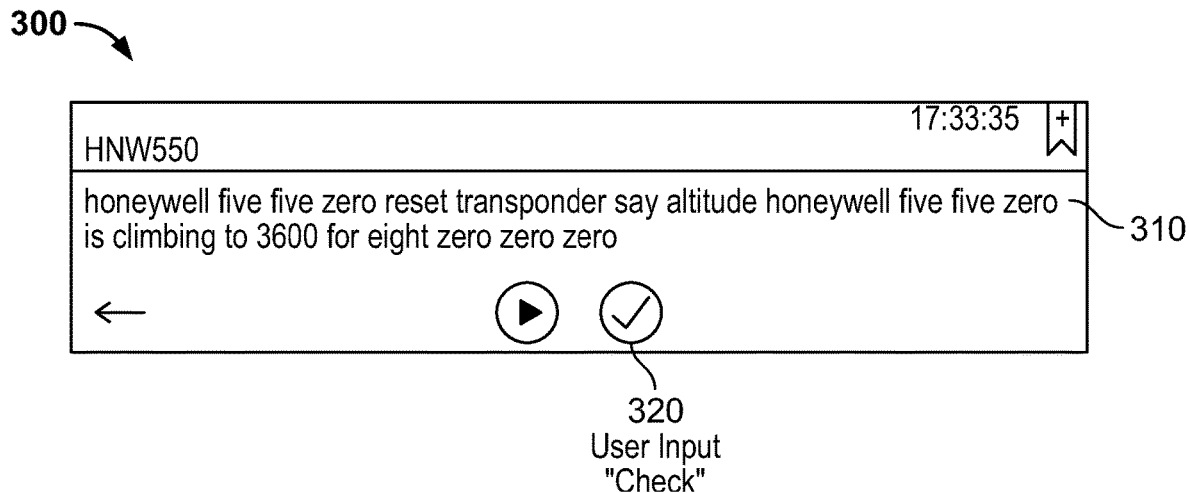
FIG. 3 depicts an exemplary display of a scenario of a message with information used to determine a split point by the split predictor for splitting the message for display by the transcription system in accordance with an embodiment.

FIG. 3 depicts an exemplary scenario of a display of an unsplit message for processing by the split predictor 50 to determine a split point determination of a message by the transcription system in accordance with an embodiment. In FIG. 3, an exemplary message of a processed text that is decoded is depicted on a display 300. In this scenario, the decoded text in a first pass or step of the process path in the operation of the transcription system, the following unsplit text message 310 is generated: "CALLSIGN FIVE FIVE ZERO TRANSPONDER SAY ALTITUDE CALLSIGN FIVE FIVE ZERO IS CLIMBING TO THREE SIX ZERO ZERO FOR EIGHT ZERO ZERO ZERO". In this exemplary message, the split predictor determines that the decoded message is unsplit and requires configuring a new split point. The split predictor 50 then predicts a new split point using the various processes and intelligent algorithm earlier described, and the new split point is based on the textual context of the decoded message content. The split point is configured by the split predictor in the audio message and the speech decoder is instructed in a second pass on how to decode the audio segment (i.e., the audio segment generated by the VAD module) based on the new split. The message, in this case, is configured with a split point based on extracting the call sign information or "CALLSIGN FIVE FIVEZERO", and the split point is configured at the start of the repetition of "CALLSIGN FIVE FIVE ZERO" that appears in the message content. Hence, the exemplary message is configured into two messages based on the split point of the second instance of the callsign information of "CALLSIGN FIVE FIVE ZERO". The speech decoder based on the split point configured by the split predictor in the audio segment would generate a first message of "CALLSIGN FIVE FIVE ZERO TRANSPONDER SAY ALTITUDE", and the second decoded text of the message "CALLSIGN FIVE FIVE ZERO IS CLIMBING TO THREE SIX ZERO ZERO FOR EIGHT ZERO ZERO ZERO". The result is two text messages that are displayed, and that are distinct from each other on the display device rather than a compound message with the call sign information intermingled.

In an embodiment, the transcription system may be enabled to receive user input to mark displayed text manually by the user that is unsplit (for example via a graphically generated check box 320 associated with the display text). In this case, the user selection is indicative of a split and this information can be directly communicated to the split predictor to identify split points and configure audio segments for displaying messages devoid of split points (i.e., unsplit messages).

In another exemplary embodiment, the decoded processed text that is generated from the speech decoder is as follows: "AMERICAN TWENTY FOUR FIVE DESCEND AND MAINTAIN FLIGHT LEVEL THREE FIVE ZERO AMERICAN TWENTY FIVE FORTY-FIVE." The split predictor indicates that the message is unsplit (and requires a new split point to be configured). The split predictor would instruct the speech decoder to re-decode the audio segment based on a new audio segment split point that is configured based on the intelligent processing of the content of the textual message and identifies the split point based on (in this case) on the repetitive use of the information of airline name and/or flight number, or just the airline name, or just the flight number of "AMERICAN TWENTY FOUR FIVE" or "AMERICAN" or "TWENTY FOUR FIVE". The repetitive use of each of the terms together or individual is indicative by the split predictor that the decoded message is unsplit. The split point is then obtained based on the Airline name or flight number or both, and the corresponding audio segment split point would be configured for the audio segment processing by the speech decoder. The text message after the second pass and based on the split point obtained results in two separate generated messages from the speech decoder as follows: message 1: "AMERICAN TWENTY FOUR FIVE DESCEND AND MAINTAIN FLIGHT LEVEL THREE FIVE ZERO" and message 2: "THREE FIVE ZERO AMERICAN TWENTY FIVE FORTY-FIVE".

In another exemplary embodiment, the processed text decoded by the speech decoder for this display is the unsplit message: "SKYWEST FORTY-SEVEN TWENTY FOUR SAN FRANCISCO TOWER TRAFFIC AIRBUS THREE TWENTY HOLDING IN POSITION WIND ONE NINE ZERO AT ONE ONE RUNWAY TWO EIGHT LEFT CLEARED TO LAND". The split predictor output, in this case, determines that the segment is normal and therefore there is no split point to obtain and the split point determination process is not initiated. In this instance, the determination that the message is not unsplit is made by the split predictor because there is no repetitive use of a callsign or other critical information in the content of the message this is indicative of a split point and that the message is unsplit.

In another exemplary embodiment, the processed text of a clearance message that is decoded by the speech decoder for display is as follows: "AMERICAN EIGHTEEN NINETY-SEVEN CHARLOTTE TOWER RUNWAY THREE SIX RIGHT LINE UP AND WAIT LINE UP AND WAIT THREE SIX RIGHT EIGHT NINE SEVEN". The clearance message is split into the first message: "AMERICAN EIGHTEEN NINETY-SEVEN CHARLOTTE TOWER RUNWAY THREE SIX RIGHT LINE UP AND WAIT" and a second message: "LINE UP AND WAIT THREE SIX RIGHT EIGHT NINE SEVEN". In this case, the split point is determined by the split predictor based on the repetitive use of the phrase containing the critical how to proceed instructional information of "LINE UP AND WAIT" by the air traffic control to the flight personnel and this can be considered a contextually based determination by the split predictor.

Figure 4:
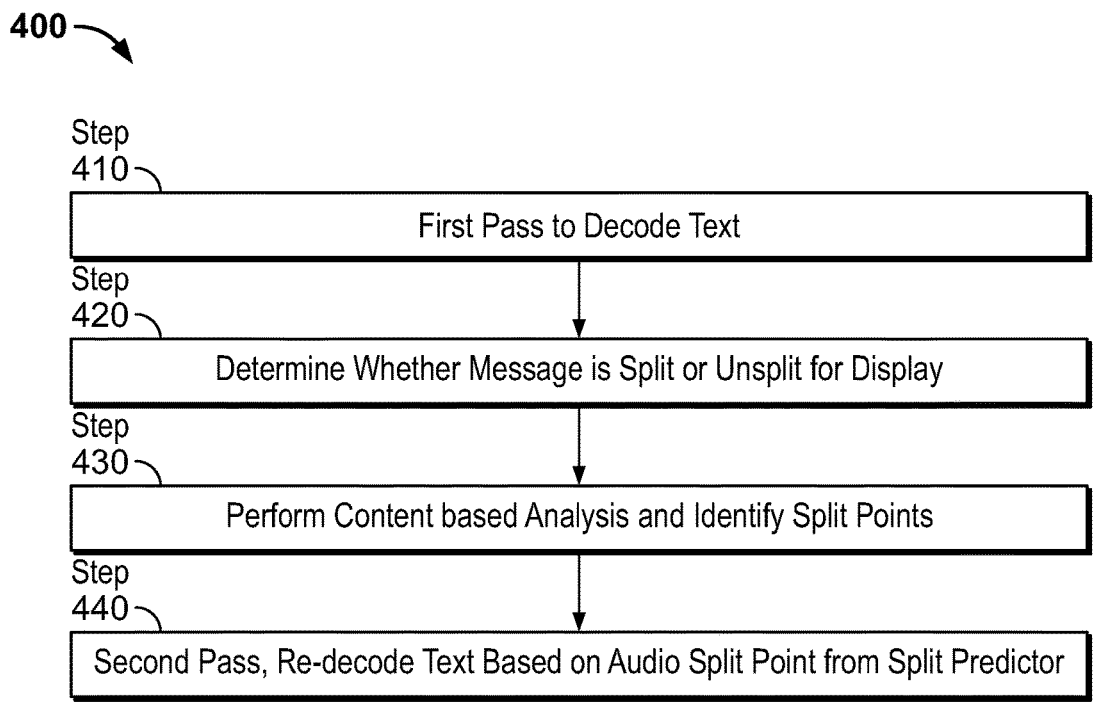
FIG. 4 depicts an exemplary flow diagram of the multiple pass operations to determine a split point by the split predictor of the transcription system in accordance with an embodiment.

FIG. 4 illustrates an exemplary flowchart 400 of the process of the split predictor to determine a split point in a decoded message of the transcription system in accordance with an embodiment. In FIG. 4, at step 410, a first pass or initial operation of the transcription flow process is initiated where decoded text is generated by the speech decoder from an audio segment. At step 420, after the NLP has processed the decoded text, the split predictor determines whether the message from the decoded text is unsplit. At step 430 the split predictor may extract call sign and/or other critical information from the decoded text and perform a content-based analysis. If the call sign or any other information in the message is determined by the split predictor to have been repeated or it is verified by other content-based analysis that the unsplit segments contain one or more split points (i.e., the message is an unsplit message) such as by using various intelligent applications (such a neural network) for the content-based analysis, then the split predictor will initiate a re-decode operation by the speech decoder of the audio segment. by the speech decoder. At step 440, the audio segment is split in a re-decode operation as instructed by the split predictor that can result in configuring multiple audio segments for decoding by the speech decoder in a second pass. In another embodiment, the split predictor may use speaker characteristics to identify the split points for messages wherein the first part is spoken by one speaker and the other part is with another speaker.

The output of the speech decoder is processed text that contains no split points that are sent to a display device for display.

In another embodiment, the transcription system may implement a different architecture of the VAD module combined with the split predictor that is trained to handle dialogue with shorter pauses between speakers, for example, pauses that are as low as 10-20 milliseconds (ms) between the clearances. The VAD module will split audio using split points based on input audio by combining processing with the split predictor configured on the front end within the VAD module.

Figure 5:
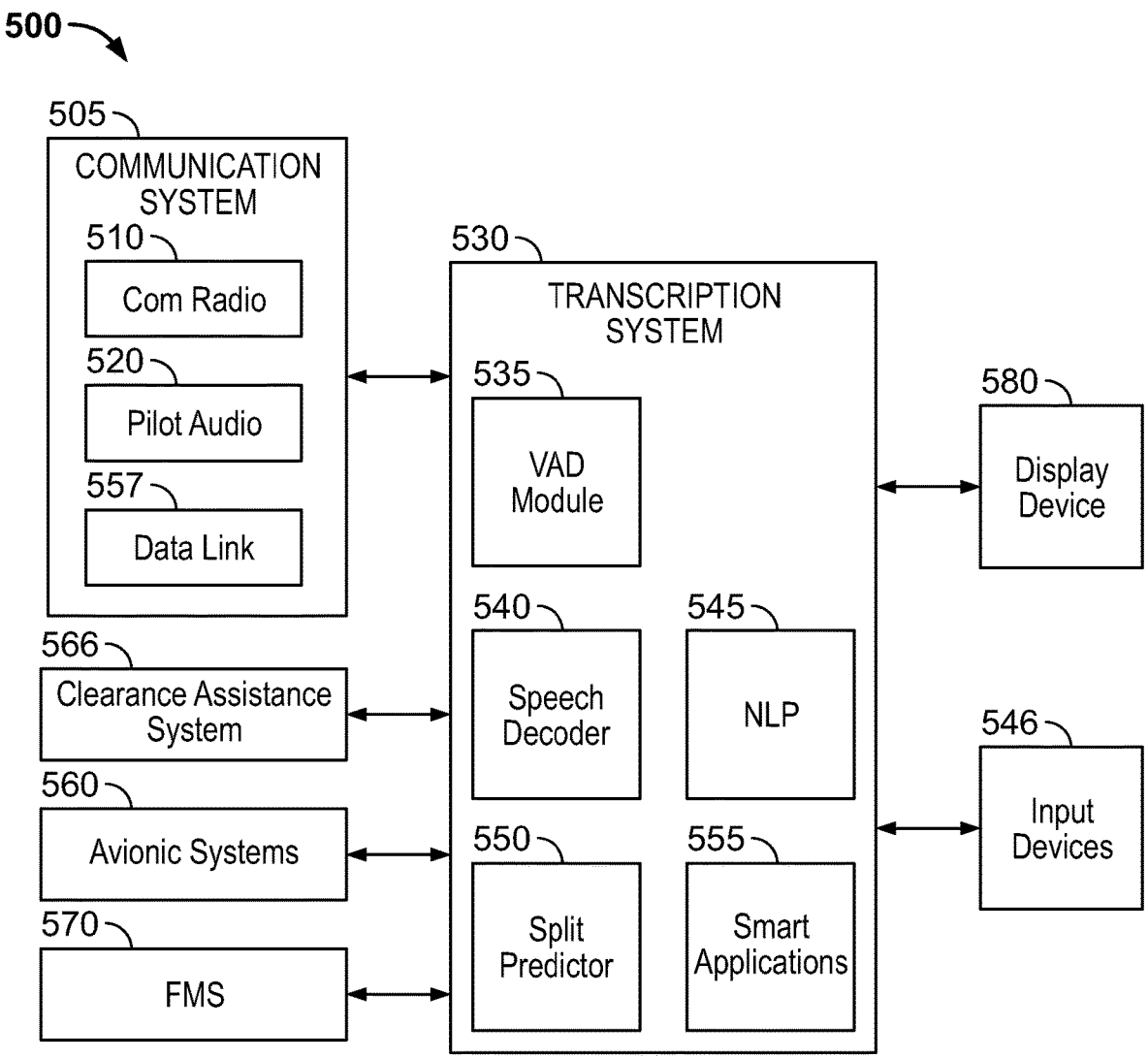
FIG. 5 depicts an exemplary architecture of the processing system in an aircraft of the transcription system in accordance with the embodiment.

FIG. 5 is an exemplary embodiment of a processing system 500 that uses a split predictor with a Voice Activity Detection (VAD) module in a transcription system which may be utilized in an aircraft in accordance with an embodiment. In an embodiment, in FIG. 5, a clearance message or clearance command may be received from the Air Traffic Control (ATC) via the communication system 505 of an aircraft that may be configured to include several communication channels or interfaces of a data link 557, a COM radio 510, and pilot audio 520 for sending and receiving commands and instructions in different flight phases or flight transition on a selected VHF band.

In an embodiment, in the case of an ATC audio message (e.g., ATC clearance audio message), an aeronautical operational control (AOC) message, and/or a pilot voice audio, the various audio type messages are processed to a transcription system 530 for speech-to-text conversion and for displaying the transcribed text on the display device 580 for visual notification to the pilot. The transcription system 530 can be implemented with one or more different ASR models by the NLP 545 for enhanced speech transcription of the performance of the functions associated with inputs from the clearance assistance system 566, avionic systems 560, and Flight Management System (FMS) 570.

In an implementation, incoming audio is received by the VAD module 535 on an input channel and the VAD module 535 is configured to generate an audio segment as output to a speech decoder 540. The VAD module 535 is not able to separate voice segments between speakers that are being monitored and that occur with shorter than normal pauses between the speakers. For example, pauses in the vicinity of a threshold amount of 20 milliseconds or less are generally likely, not detectable, or not consistently detectable in distinct voice segments. The result is that voice segments are generated that contain multiple voice segments that should be separated for better clarity when displayed. The messages that contain more than one voice segment can be defined as unsplit messages.

The speech decoder 540 enables speech-to-text conversion by performing a decode operation to convert the audio segment into a textual message. In other words, the speech decoder transcribes text from the audio segment generated by the VAD module 535. The transcribed text is sent to the NLP 545 that can apply certain intelligent speech recognition solutions (i.e., intelligent applications 555). In an embodiment, a split predictor 550 is configured in the processing path, to determine whether the processed text from the NLP 545 is a split or unsplit message. In an implementation, the split predictor 550 can apply certain smart applications (i.e., Artificial Intelligence (AI) applications that may include neural network (NN) solutions) to determine whether the output from the NLP 545 is a split or an unsplit message.

In an embodiment, the split predictor 550 based on a content-based analysis of the message text via a smart application, determines whether or not the message text contains a split point. As an example, the split predictor 550 may analyze the message content during the first pass of a text decode operation for repetitive use of call signs or other critical information, and/or multiple speaker dialogues to determine whether the message contains any split points. The split predictor 550 may also be configured to determine split points of pause that are less than a threshold value configured in a set of ranges of approximately 10, 20, and 30 milliseconds or less.

If there aren't any split points found in the message, then the output from the NLP 545 will be sent to a display device 580 for the display of the message. If there is a split point that is determined, then using a split point that is configured by the split predictor 550 in an audio domain (and not in the textual domain), the split predictor 550 splits the audio in chunks and then passes the chunks to a speech decoder 540 for re-decoding of the split audio chunks by considering each chunk as an independent message. This enhances the resultant outputted ASR transcription by preventing transcribed textual segments from being improperly not set apart.

In an embodiment, the split point may also be received by the split predictor 550 by manual action from the user marking the split point using the input devices 546. Also, the split predictor 550 may be configured with the VAD module 535 to enable assistance to the VAD module 535 in verifying split points such as those from shorter than expected pauses between speakers that the VAD module 535 is not capable of handling.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Also, certain terminology may be used in the following description for reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A transcription system with voice activity detection (VAD) comprising:
    a VAD module that is configured with an input channel to receive incoming audio and to generate at least one audio segment based on the incoming audio; and
    a speech decoder in operable communication with a split predictor and the VAD module, the speech decoder is configured to perform, in a first pass, a decode operation to transcribe text from the at least one audio segment into a message;
    wherein in the first pass, if the message is determined not to contain at least one split point based on a content-based analysis performed by the split predictor, the speech decoder forwards the message for display;
    wherein in the first pass, if the message is determined, based on the content-based analysis performed by the split predictor, to contain the at least one split point, the speech decoder performs, in a second pass, a re-decode operation to transcribe text from the at least one audio segment based on the at least one split point and forwards the message for display configured in multiple text segments based on at least one audio split point, wherein the at least one split point is configured within an audio domain of the at least one audio segment by the split predictor;
    wherein the system further comprises a natural language processor (NLP) in operable communication with the speech decoder configured to communicate with the split predictor to provide content information about the message for the content-based analysis;
    wherein the content-based analysis performed by the split predictor comprises an intelligent application that determines at least repetitive usage of call signs and critical information in content of the message, or multiple speaker dialogues for defining the at least one split point in the message; and
    wherein the message containing the at least one split point is an unsplit message.

2. The transcription system of claim 1, wherein the unsplit message is caused by at least a pause in the incoming audio that is not detected by the VAD module.

3. The transcription system of claim 2, wherein the pause is less than a threshold value configured in a set of ranges of approximately 10, 20, and 30 milliseconds or less.

4. A method of implementing a transcription system, the method comprising:
    receiving, by a voice activity detection (VAD) module, incoming audio to generate at least one audio segment;
    in a first pass, decoding, by a speech decoder coupled to the VAD module, text from the at least one audio segment to generate a message; and determining, by a split predictor coupled to the speech decoder, and based on a content-based analysis, whether the message contains a split point;

wherein if the message does not contain the split point then enabling display of the message;

wherein if the message does contain the split point, then enabling re-decode by the speech decoder of the at least one audio segment based on the split point configured by the split point predictor from the content-based analysis, and enabling the display of the message configured in multiple text segments based on at least one audio split point, wherein the split point in the message is defined in an audio domain of the at least one audio segment;

wherein the method further comprises configuring a natural language processor (NLP) in operable communication with the speech decoder configured to communicate with the split predictor to provide content information about the message for the content-based analysis;

wherein the content-based analysis performed by the split predictor comprises an intelligent application that determines at least repetitive usage of call signs and critical information in content of the message, or multiple speaker dialogues for defining the at least one split point in the message; and wherein the message containing the at least one split point is an unsplit message.

5. The method of claim 4, wherein the unsplit message is caused by at least a pause in the incoming audio that is not detected by the VAD module.

6. The method of claim 5, wherein the pause is less than a threshold value configured in a set of ranges of approximately 10, 20, and 30 milliseconds or less.

7. At least one non-transient computer-readable medium having instructions stored thereon that are configurable to cause at least one processor to perform a method to segment a transcribed textual message by a transcription system, the method comprising:

receiving, by a voice activity detection (VAD) module incoming audio to generate at least one audio segment;

in a first pass, decoding, by a speech decoder coupled to the VAD module, text from the at least one audio segment to generate a message; and determining, by a split predictor coupled to the speech decoder, and based on a content-based analysis whether the message contains a split point;

wherein if the message does not contain the split point then enabling display of the message;

wherein if the message does contain the split point then enabling re-decode by the speech decoder of the at least one audio segment based on the split point configured by the split point predictor from the content-based analysis, and enabling the display of the message configured in multiple text segments based on at least one audio split point wherein the split point in the message is defined in an audio domain of the at least one audio segment by the split predictor;

wherein the method further comprises configuring a natural language processor (NLP) in operable communication with the speech decoder configured to communicate with the split predictor to provide content information about the message for the content-based analysis;

wherein the content-based analysis performed by the split predictor comprises an intelligent application that determines at least repetitive usage of call signs and critical information in content of the message, or multiple speaker dialogues for defining the at least one split point in the message; and wherein the message containing the at least one split point is an unsplit message and wherein the unsplit message is caused by at least a pause in the incoming audio that is not detected by the VAD module.

8. The method of claim 7, wherein the pause is less than a threshold value configured in a set of ranges of approximately 10, 20, and 30 milliseconds or less.

* * * * *